United States Patent
Barke et al.

(10) Patent No.: US 10,422,423 B2
(45) Date of Patent: Sep. 24, 2019

(54) OPERATING ELEMENT OF A MOTOR VEHICLE

(71) Applicant: AUDI AG, Ingolstadt (DE)

(72) Inventors: Alexander Barke, Ingolstadt (DE); Christian Niemeier, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 229 days.

(21) Appl. No.: 15/537,498

(22) PCT Filed: Dec. 18, 2015

(86) PCT No.: PCT/EP2015/080397
§ 371 (c)(1),
(2) Date: Jun. 19, 2017

(87) PCT Pub. No.: WO2016/097244
PCT Pub. Date: Jun. 23, 2016

(65) Prior Publication Data
US 2017/0343102 A1 Nov. 30, 2017

(30) Foreign Application Priority Data
Dec. 19, 2014 (DE) .......... 10 2014 019 126

(51) Int. Cl.
*F16H 59/00* (2006.01)
*F16H 59/02* (2006.01)
(Continued)

(52) U.S. Cl.
CPC ......... *F16H 59/0204* (2013.01); *B60K 20/06* (2013.01); *B60K 35/00* (2013.01);
(Continued)

(58) Field of Classification Search
CPC ........ F16H 59/0204; B60K 2350/1036; B60K 2350/2004; G06F 3/016
See application file for complete search history.

(56) References Cited

U.S. PATENT DOCUMENTS 3,879,586 A * 4/1975 DuRocher ............ H01H 13/702
200/5 A
5,697,493 A * 12/1997 Sach .................... H01H 13/702
200/313
(Continued)

FOREIGN PATENT DOCUMENTS

| CN | 101551007 A | 10/2009 |
|---|---|---|
| CN | 101809333 A | 8/2010 |

(Continued)

OTHER PUBLICATIONS

Chinese Office Action dated Sep. 4, 2018, in connection with corresponding CN Application No. 201580068767.0 (14 pgs., including English translation).

(Continued)

*Primary Examiner* — David M Fenstermacher
(74) *Attorney, Agent, or Firm* — Maier & Maier, PLLC

(57) ABSTRACT

An operating element of a motor vehicle provided with a contact surface. The contact surface is provided with an element, controllable via actuators, that responds to the sense of touch of an operator, through which a feedback is provided to the operator about the currently engaged gear of the transmission of the motor vehicle.

5 Claims, 1 Drawing Sheet

(51) Int. Cl.
    *B60K 20/06*     (2006.01)
    *B60K 35/00*     (2006.01)
    *B60K 37/06*     (2006.01)
    *F16H 61/24*     (2006.01)
    *F16H 63/42*     (2006.01)
    *G06F 3/01*     (2006.01)
    *B62D 1/04*     (2006.01)
    *F16H 59/04*     (2006.01)

(52) U.S. Cl.
    CPC .............. *B60K 37/06* (2013.01); *B62D 1/046* (2013.01); *F16H 59/0278* (2013.01); *F16H 59/044* (2013.01); *F16H 61/24* (2013.01); *F16H 63/42* (2013.01); *G06F 3/016* (2013.01); *B60K 2370/1446* (2019.05); *B60K 2370/158* (2019.05); *B60K 2370/1537* (2019.05); *B60K 2370/782* (2019.05); *F16H 2063/423* (2013.01)

(56) References Cited

U.S. PATENT DOCUMENTS

| | | | |
|---|---|---|---|
| 2005/0134116 A1* | 6/2005 | Hein | B60K 37/06 307/10.1 |
| 2008/0017441 A1 | 7/2008 | Tanida et al. | |
| 2009/0039239 A1* | 2/2009 | Amoriza Berasaluce | H03K 17/9631 250/221 |
| 2009/0248260 A1 | 10/2009 | Flanagan | |
| 2009/0270223 A1* | 10/2009 | Cook | B60K 20/06 477/77 |
| 2013/0233120 A1* | 9/2013 | Golomb | B60Q 1/0082 74/552 |
| 2014/0266812 A1* | 9/2014 | Rajkowski | G06F 3/0234 341/22 |
| 2014/0283639 A1 | 9/2014 | Kim | |
| 2015/0114158 A1* | 4/2015 | Tenbrink | F16H 59/0278 74/473.25 |
| 2015/0159747 A1* | 6/2015 | Hoskins | F16H 59/0217 74/473.23 |
| 2015/0167827 A1* | 6/2015 | Fett | F16H 59/08 74/473.3 |
| 2016/0137217 A1* | 5/2016 | Golomb | B60Q 1/0082 74/473.3 |
| 2016/0186858 A1* | 6/2016 | Park | F16H 61/24 74/473.3 |

FOREIGN PATENT DOCUMENTS

| | | |
|---|---|---|
| CN | 103946764 A | 7/2014 |
| DE | 42 28 982 C1 | 9/1993 |
| DE | 14 00 790 A1 | 5/1995 |
| DE | 100 00 338 A1 | 7/2001 |
| DE | 10 2010 032 774 A1 | 2/2012 |
| DE | 10 2012 215 224 A1 | 3/2013 |
| DE | 10 2012 203 095 A1 | 9/2013 |
| EP | 2 610 710 A1 | 7/2013 |
| JP | 2010128788 A | 6/2010 |

OTHER PUBLICATIONS

International Preliminary Report on Patentability dated Jun. 29, 2017, in connection with corresponding international application No. PCT/EP2015/080397 (7 pgs.).

Examination Report dated Oct. 2, 2015 of corresponding German application No. 102014019126.5; 5 pgs.

International Search Report dated Apr. 11, 2016 of corresponding International application No. PCT/EP2015/080397; 14 pgs.

\* cited by examiner

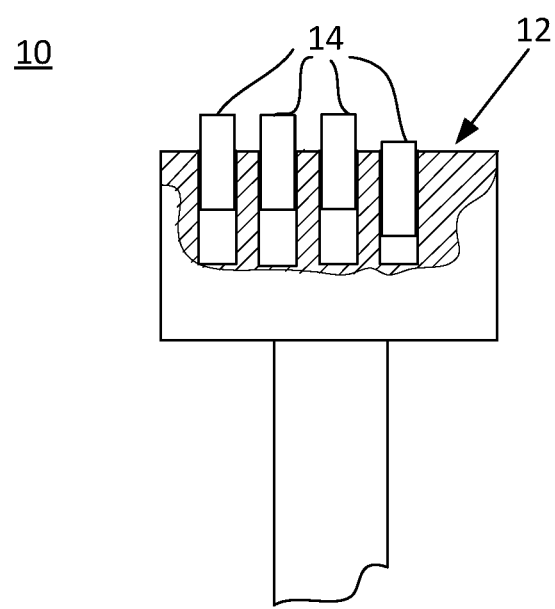

OPERATING ELEMENT OF A MOTOR VEHICLE

FIELD

The present invention relates to an operating element of a motor vehicle.

BACKGROUND

A selection lever knob is either built into motor vehicles that are provided with an automatic transmission, or optional rocker switches are arranged on the steering wheel, which allow the driver to change the gear. When the rocker switches are attached to the steering wheel, they can be used so that the driver does not have to remove the hands from the steering wheel.

However, the selector lever knob and/or rocker switches do not provide any feedback for the driver as to which gear is currently selected. In order to see which gear is currently engaged, the driver must look at the dashboard and thus turn his attention away from the road.

DE 10 2010 032 774 A1 discloses a driver switch for operating the transmission function of a transmission in a drive train, which forms a resilient counterforce and/or latching positions that are formed against the current actuation and thus provide a haptic feedback for the driver. The driver switch is in this case characterized in that the switching arrangement is designed so that by means of actuators, with the actuation of the driver switch, with additional noticeable effects and/or noticeably changed conduct countering the operational movements, a feedback or a feedback message can be provided for the driver by means of the additional haptic feedback. This is intended so that the driver will be able to feel and experience with an incorrect actuation or with an actuation that does not make sense a suddenly noticeable resistance, or a strong, noticeable vibration of the switch or of the switch components, namely by means of a perception of an extended haptic signal, if the driver's intent is contrary to the system control.

SUMMARY OF THE DISCLOSURE

The object of the invention is thus to further develop an operating element of a motor vehicle in such a manner so that it is possible to detect the currently engaged gear of the transmission of the motor vehicle via the operating element.

The operating element according to the invention comprises a contact surface, and it is characterized in that the contact surface is provided with a means responding to the touch of the operator through controllable actuators, by means of which feedback information about the currently engaged gear of the transmission of the motor vehicle is provided to the driver.

The embodiment of the operating element according to the invention has the effect that information about the currently engaged gear is transmitted via the sense of touch when the contact surface is touched. This means that the driver of the motor vehicle "recognizes" the currently engaged gear without having to look away from the road. This ensures that the driving safety is increased in this manner.

According to a particularly advantageous embodiment of the invention, a gear change recommendation is transmitted via a feedback means to the operator. This embodiment also proves to be more ecological because an ecological and/or sport-like driving mode is enabled by means of the gear change recommendation.

It is preferred in this case when the means is designed in such a way that the means can be perceived by the operator in a tactile and haptic manner, in particular in the form of vibrations, temperature, size, contour and/or surface texture.

A preferred embodiment of the invention provides that the means are designed in the form of elements that are realized as variable elements with respect to changeable graphic patterns and/or letters and/or grids made of points.

The operating element according to the invention is preferably a gear selection switch, a rocker switch and/or a steering wheel. The design of the steering wheel is particularly advantageous for an operating element designed according to this invention, because the transfer of information via the currently engaged gear takes place also when the steering wheel is held "with both hands", which in turn has a positive effect on driving safety.

BRIEF DESCRIPTION OF THE DRAWING

Further advantages, features and application possibilities of the present invention will become evident from the following description in connection with the embodiment illustrated in FIG. 1.

FIG. 1 shows an operating element of a motor vehicle designed according to the invention.

DETAILED DESCRIPTION OF THE DRAWING

FIG. 1 shows an operating element of a motor vehicle designated overall by the reference numeral 10.

The operating element 10 is in the present form designed as a gear selection switch. The gear selection switch 10 is provided with a contact surface 12.

As one can further see from FIG. 1, the gear selection switch 10 is provided with a plurality of pin-shaped element 14, which can be actuated by means of actuators—not shown here for better clarity of the illustration. This means that pin-shaped elements can be extended or retracted via the actuators and they can thus be felt or perceived by touch depending on their position by an operator who is touching the contact surface 12.

As shown in FIG. 1, three pin 14 are fully extended. The operator thus receives in this manner a feedback indicating that the third gear is engaged. Since the driver is currently in the process of accelerating, a fourth pin partially changes its position at a certain rotational speed in order to provide further information to the driver with a haptic switch recommendation. This ensures that the driver is also informed about an optimal point in time about a gear change.

The invention claimed is:
1. An operating element of a motor vehicle, comprising:
a contact surface, wherein the contact surface can be controlled to extend and retract, and is provided with at least one element that is responsive to a sense of touch of an operator, resulting in a feedback about a currently engaged gear of a transmission of the motor vehicle provided to the operator, wherein the at least one element is in the form of pins which can be moved out of the contact surface.
2. The operating element according to claim 1, wherein the at least one element provides a feedback about a gear change recommended to the operator.

3. The operating element according to claim 1, wherein the at least one element can be perceived in a tactile manner by the operator.

4. The operating element according to claim 1, wherein the at least one element can be perceived in a haptic manner by the operator.

5. The operating element according to claim 4, wherein the at least one element is provided with a changed surface texture of the contact surface.

* * * * *